L. BEEMER.
Improvement in Portable Butter-Trays.

No. 114,516. Patented May 9, 1871.

United States Patent Office.

LEVI BEEMER, OF LIBERTYVILLE, NEW JERSEY.

Letters Patent No. 114,516, dated May 9, 1871.

IMPROVEMENT IN PORTABLE BUTTER-TRAYS.

The Schedule referred to in these Letters Patent and making part of the same.

*To all whom it may concern:*

Be it known that I, LEVI BEEMER, of Libertyville, in the county of Sussex and State of New Jersey, have invented a new and improved Butter-Tray and Portable Stand; and I do hereby declare that the following is a full, clear, and exact description of the same, reference being had to the accompanying drawing and to the letters of reference marked thereon.

My device consists of a butter-tray having flaring sides and ends, one end of which is narrower than the other, and is provided with a waste-gate in order to lead off through a spout attached to the tray the milk and water after it is separated from the butter while it is being worked. This tray is placed upon a framework somewhat resembling that of a wheelbarrow, and corresponding in length and width with the bottom of the tray for the purpose of moving it wherever desired.

Similar letters, where they occur, denote like parts in the drawing.

Figure 1:
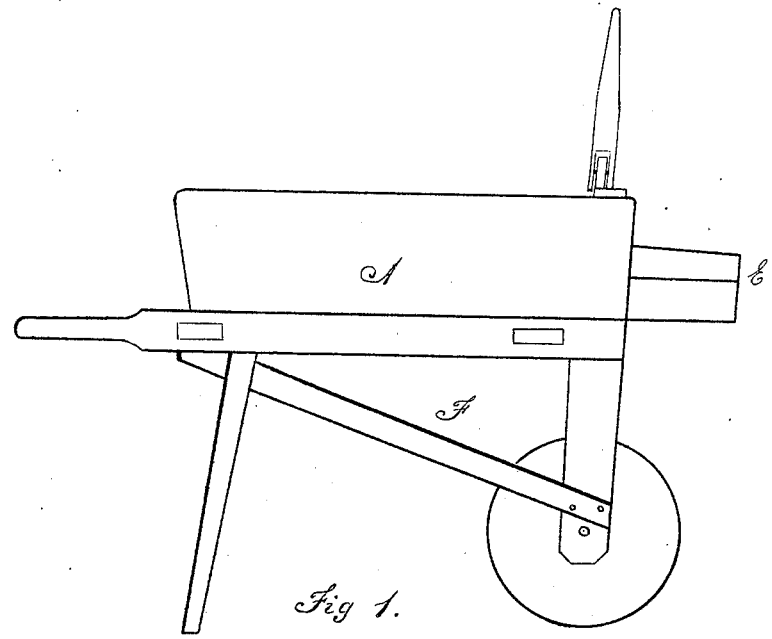
Figure 1 is a side view of my improvement.
Figures 2, 3:
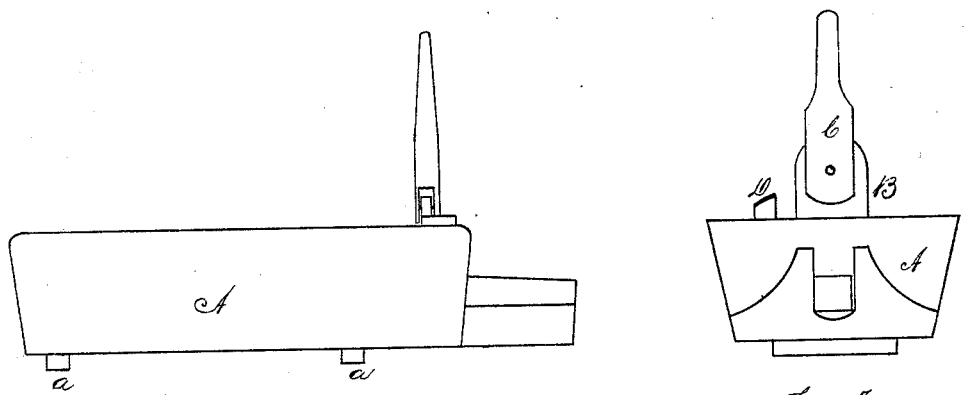
Figure 2 represents the tray.
Figure 3 shows an end view and the mode of operating the waste-gate.
Figure 4:
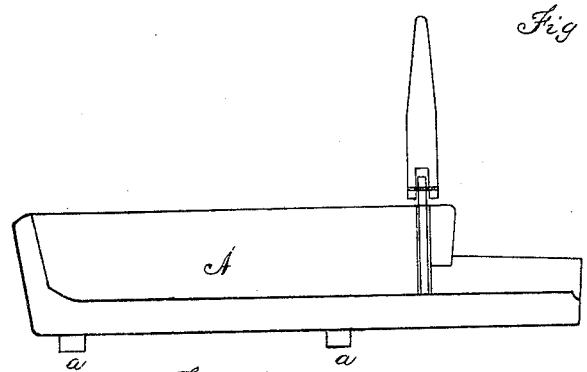
Figure 4 is a longitudinal bisection.

In order to enable others to make use of my invention I will proceed to describe the same.

A is the tray.

At the narrowest end thereof is the waste-gate B, which is held in its position by means of grooves or slots in the tray, and is operated by means of the lever C working upon the fulcrum D, allowing the milk and water to pass off through the spout E, which is attached to the tray A.

This tray is placed upon the frame F, and is provided with small straps *a a* on the bottom to prevent its moving from the frame when being conveyed from one place to another.

This tray can be taken off the frame and used separately the same as any ordinary tray.

By this arrangement the labor and fatigue of lifting and carrying trays filled with butter are very materially lessened, and the draining is done at the same time that the butter is being worked.

Having thus fully described my invention,

What I claim as new, and desire to secure by Letters Patent, is—

The combination of the frame F and removable butter-tray A with trough E, waste-gate B, lever C, and fulcrum D, as and for the purpose set forth.

In testimony whereof I have signed my name to this specification in the presence of two subscribing witnesses.

LEVI BEEMER.

Witnesses:
GEORGE W. COE,
WILLIAM W. COX.